June 14, 1966     O. A. WILLIAMS     3,255,772

ROTARY SLIDE GATE VALVE

Filed Jan. 9, 1964     2 Sheets-Sheet 1

INVENTOR.
ORVILLE A. WILLIAMS
BY Hofgren, Wegner,
Allen, Stellman & McCord
ATTYS.

June 14, 1966  O. A. WILLIAMS  3,255,772
ROTARY SLIDE GATE VALVE
Filed Jan. 9, 1964  2 Sheets-Sheet 2
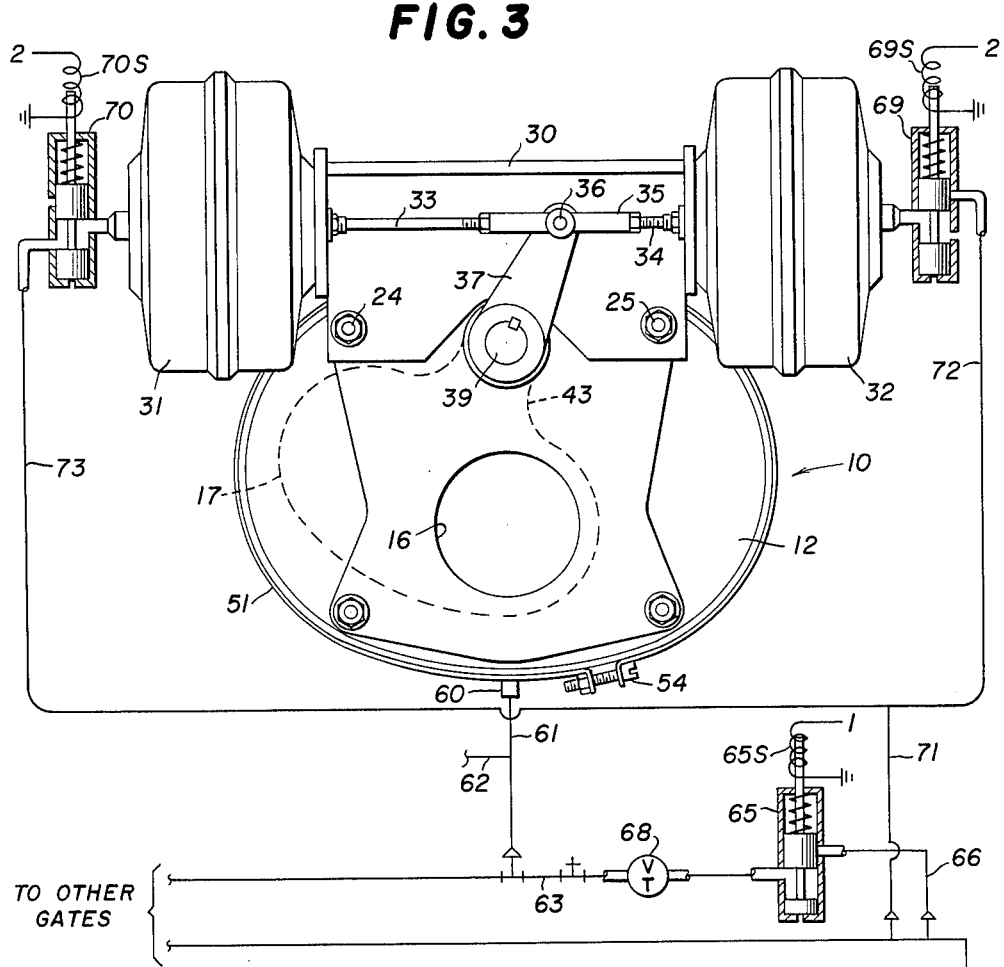
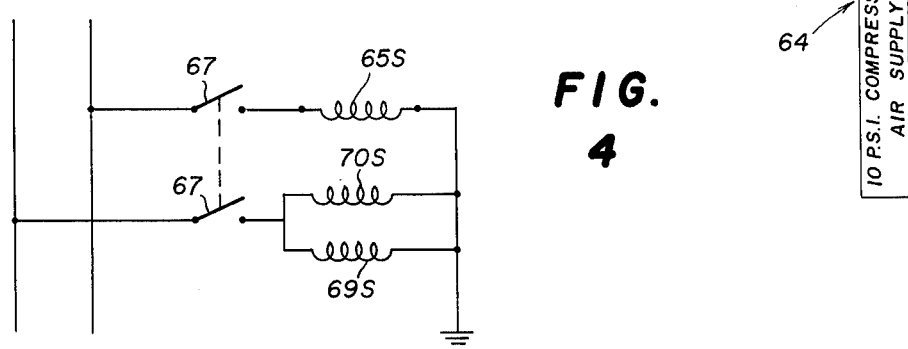

United States Patent Office 3,255,772
Patented June 14, 1966

3,255,772
ROTARY SLIDE GATE VALVE
Orville A. Williams, Mount Prospect, Ill., assignor to United Conveyor Corporation, a corporation of Illinois
Filed Jan. 9, 1964, Ser. No. 336,783
6 Claims. (Cl. 137—375)

This invention relates in general to a rotary slide gate type shutoff valve for use in a material conveying pipe line wherein the material is carried in suspension by fluid flow through the pipe line.

In fluid conveying systems, it is conventional to employ a rotary slide gate valve as a means of controlling the flow of fluid through the system. With such a system handling fly ash or other abrasives, it heretofore has not been practical to make a rotary slide gate valve that will not wear, and thereby increase the clearance between the rotary slide gate and the two valve seat plates. A fluid conveyor may operate with the pipe line at positive pressure, negative pressure or a variable pressure which may be either positive or negative. Under positive pressure conditions, the fluid carrying dust will leak to the atmosphere to an extent that is not tolerable. This means that in such service the gate must be fully enclosed, and when fully enclosed the pressure in the pipe line will cause fine material to drift or settle into the clearance area in which the slide gate moves, ultimately making the slide inoperable. I have found that this accumulation can be prevented by the use of a small quantity of outside fluid which can be allowed to flow into the closed off area where the rotary slide gate moves. Where the fluid operated material transport line operates above atmospheric pressure, fluid at a pressure one or two pounds above the pressure in the pipe line should be connected to the closed off gate area. Where the transport line operates at a pressure below atmospheric, a pipe to the enclosed area provided with a restricted inlet to control the amount of fluid entering the system is all that is required. When varying pressures are present in the transport line, as when the gate is being moved into or out of the closed position, I have found that a shot of fluid blown into the gate enclosure area at the time the gate slide is being moved will usually keep the area clean.

It has also been found desirable in fluid conveying systems for ash and like abrasive materials to provide a valve which is readily accessible, and easily assembled and disassembled, so that the interior of the valve may be cleaned periodically. Prior art valves have in the past been relatively difficult to disassemble, so that the disassembling and cleaning thereof has been a difficult and time consuming operation.

Accordingly, the general purpose of the present invention is to provide an improved rotary slide gate valve.

An object of the invention is to provide the enclosure of an enclosed gate valve of a fluid conveying system with a charge of fluid at a higher pressure than the conveyor line pressure to prevent material being conveyed in the line from fouling the valve.

Another object of the invention is to provide the valve chamber of a rotary slide gate valve in a fluid conveying system with a charge of pressurized fluid when the gate is being moved to open or close the valve to prevent material passing through the valve from escaping into the chamber.

Another object of the present invention is the provision of a rotary slide gate valve wherein the interior of the valve chamber is readily accessible, and may be easily assembled and disassembled with a minimum number of tools, and with a minimum expenditure of time and energy.

A further object of the invention is to provide a valve having the characteristics set forth in the preceding paragraph with improved sealing means which is effective to create an air tight seal, and which is easily removable from the valve.

A still further object of the invention is to provide a rotary slide gate valve which is simple in construction, efficient in operation, well adapted for its intended purposes, and relatively inexpensive to manufacture and maintain.

These and other objects of the invention will hereinafter become more fully apparent from an examination of the following specification and annexed drawing, wherein:

FIGURE 3 is a front elevational view, similar to FIGURE 1, and schematically illustrating the fluid system for actuating the valve; and FIGURE 4 is an electrical schematic diagram of the controls for the fluid system shown in FIGURE 3.

Figure 1:
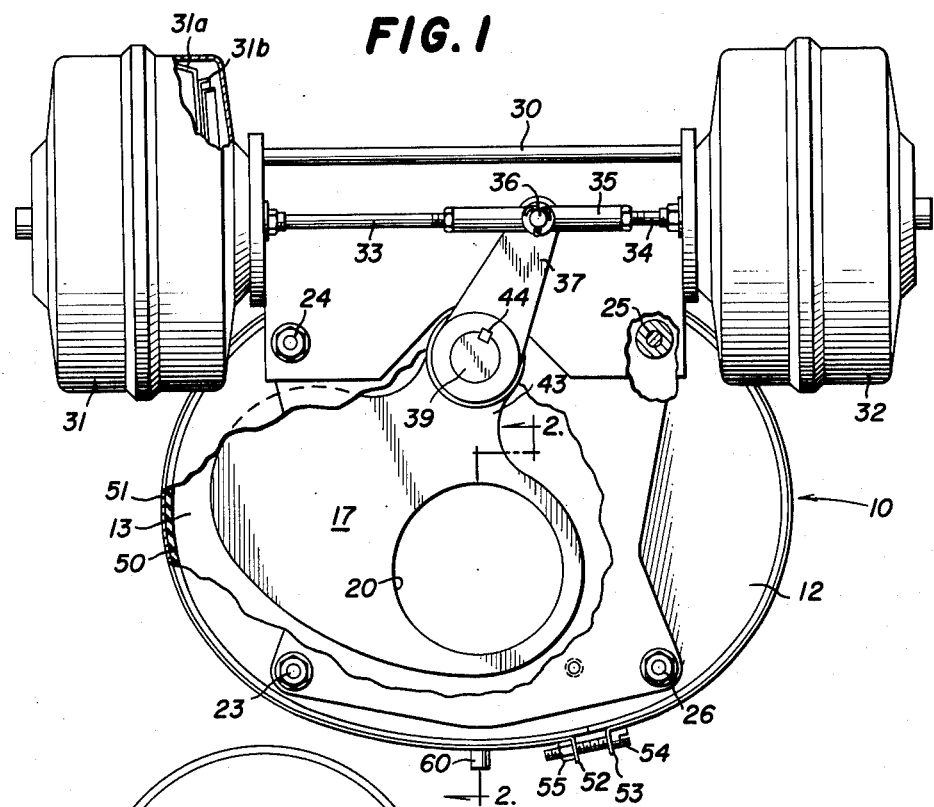
FIGURE 1 is a front elevational view of a preferred embodiment of the invention, with certain parts broken away for clarity.

While this invention is susceptible of embodiment in many different forms, there is shown in the drawing and will herein be described in detail one specific embodiment, with the understanding that the present disclosure is to be considered as an exemplification of the principles of the invention and is not intended to limit the invention to the embodiment illustrated. The scope of the invention will be point out in the appended claims.

Figure 2:
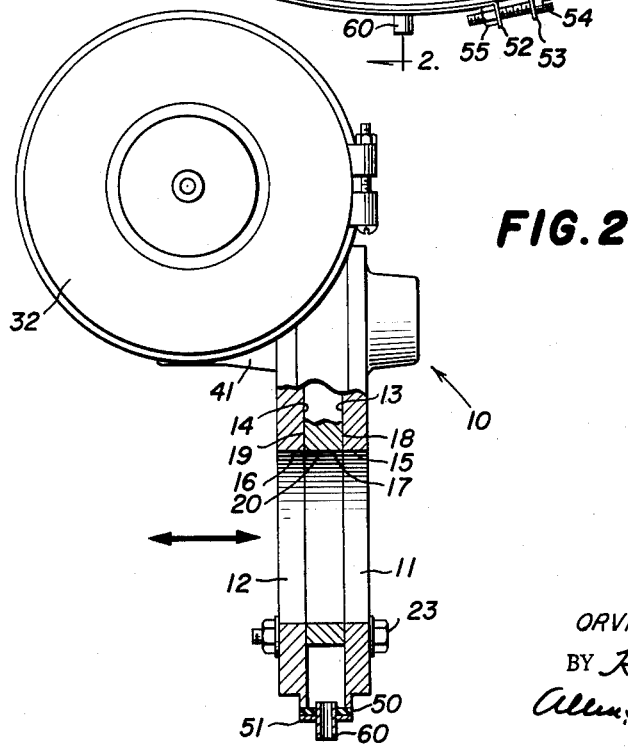
FIGURE 2 is a side elevational view of the apparatus illustrated in FIGURE 1, with portions thereof being shown in section, looking generally along the line 2—2 of FIGURE 1.

Referring now to the drawing, the valve of the present invention includes a body 10, which is seen in FIGURE 1 to be somewhat ellipsoidal in shape. Valve body 10 includes a pair of generally identically shaped valve plates 11 and 12, having spaced parallel surfaces 13 and 14, respectively, and respective axially aligned openings 15 and 16 (FIGURE 2). A gate member 17 is positioned between valve plates 11 and 12, and includes parallel sides 18 and 19 which are slidably received between faces 13 and 14, respectively. An opening 20 extends through gate member 17, and is adapted to be positioned in axial alignment with openings 15 and 16 when gate 17 is in the open position as shown in FIGURES 1–3, to provide a through passage for the flow of air, as shown by the arrow in FIGURE 2. The valve plates 11 and 12 are retained and spaced in rigid alignment by bolts 23–26 which impale matching openings in plates 11 and 12 and spacer sleeves located between the plates.

Valve body 10 is secured to a bracket 30 by the aforementioned bolts 24 and 25, which also impale suitable openings in the bracket. Air motors 31 and 31, or any other suitable fluid or electrically driven actuators, are mounted on opposed sides of bracket 30, and, as illustrated, include rods 33 and 34, respectively, which are pneumatically actuated, as by the movement of a diaphragm 31a against a spring 31b to reciprocate slide members 33 and 34 relative to bracket 30. A yoke 35 is adjustably secured between the ends of rods 33 and 34, and is provided at its central portion with a pin 36 upon which a downwardly extending lever 37 is pivotally mounted. The lower end of lever 37 is fixedly secured to a shaft 39, that is pivotally mounted in a hub 41, formed integrally with valve plate 12.

Gate 17 includes an arm 43 that is fixedly secured to shaft 39 by any suitable means, as by key 44, or by associating a square shaft portion with a complementarily shaped bore in arm 43. Thus, when rods 33 and 34 move to the left, as viewed in FIGURE 1 and FIGURE 2, shaft 39 is rotated in a counterclockwise direction, and gate 17 moves in a counterclockwise direction to stop the flow of air through the valve. Movement of rods 33 and 34 to the right, as viewed in FIGURE 1, rotates shaft 39 and gate 17 in a clockwise direction to create an open passage for air or other suitable fluid flow through the valve. The diaphragm and spring construction of the air motors 31 and 32 permits the rods 33 and 34 to rock sufficiently to accommodate the arcuate movement of pin 36 in valve lever 37 without binding.

Sealing means are provided for valve body 10, and include a gasket 50 formed of suitable gasket material which extends peripherally around valve plates 11 and 12. A band of thin, flexible, spring like metallic material 51 is positioned around gasket 50, and is provided at its end portions with outwardly bent parallel ears 52 and 53. Ears 52 and 53 are provided with holes for reception of a bolt 54, which is secured by a nut 55 to provide take-up means which press band 51 and gasket 50 into firm sealing engagement with the periphery of valve plates 11 and 12. As is best seen in FIGURE 3, means are provided for introducing pressurized fluid into the valve chamber formed between plates 11 and 12, and in the illustrated embodiment includes a pipe section 60 that extends through openings provided in band 51 and gasket 50 into the valve chamber. Pipe section 60 may be fixed in place as by brazing it to band 51.

A pneumatic line 61 communicates with pipe section 60, and by a suitable T connection, with another pneumatic line 62. When the gate valve is in a vacuum pneumatic system, line 62 is open to the atmosphere to allow a restricted amount of air at atmospheric pressure to enter the enclosure between valve plates 11 and 12. Since the air at atmospheric pressure is at a higher pressure than the fluid in the conveyor line, it will effectively prevent the material being conveyed in the line from escaping between gate sides 18 and 19, and valve plate faces 13 and 14. When the pressure in the transport line is above atmospheric, an external source of pressurized air, not shown, at a higher pressure than the line pressure, is connected with line 62, to keep the material being conveyed in the transport line from leaking out around the valve plates.

When gate 17 is being moved into or out of the closed position, and the transport line is subjected to varying pressures, it is desirable to supply a charge of air into the enclosure defined between valve plates 11 and 12, to retard the outflow of material being conveyed in the transport line. To this end, line 61 is connected by a suitable T connector to a pneumatic line 63, which communicates with an external source of pressurized air 64. A two-way, normally closed solenoid air valve 65 is connected in a line 66 leading from air source 64, and is adapted to be actuated to an open position when its solenoid 65s is energized by the closing of switch 67 (FIGURE 4). A throttle valve 68 is provided in line 63 adjacent valve 65 to restrict the volume of air flowing into the gate valve enclosure. The closing of switch 67 also energizes the respective solenoids 69s and 70s of normally closed three way solenoid air valve 69 and normally open three way solenoid air valve 70. When valve 69 is opened, air motor 32 is actuated by the pressurized air flowing from source 64 through lines 71 and 72, and lever 37 moves in a counterclockwise direction to close gate 17. As gate 17 is closed, valve 70 is bled to the atmosphere.

When switch 67 is opened, solenoid 65s is de-energized and valve 65 closes to interrupt the charge of air to the gate valve enclosure. The opening of switch 67 also de-energizes solenoids 69s and 70s, to close valve 69 which will be bled to the atmosphere, and to open valve 70 which will actuate air motor 31 by the pressurized air flowing through line 73 to open gate 17.

When it is desired to gain access to the interior of the valve, it is necessary merely to remove nut 55 and remove band 51 and gasket 50. The valve interior is then readily accessible for inspection, cleaning, or any other maintenance purposes. The valve may be reassembled in a correspondingly easy fashion, and thus it should be apparent that each of the objects of the invention has been fully achieved.

I claim:

1. A rotary slide gate valve for use in a pneumatic conveyor system comprising: a pair of spaced, facing valve plates having axially aligned openings; a gate slidably mounted between said valve plates and having an opening adapted to be moved into and out of axial alignment with said valve plate openings; means for moving said gate; a gasket spanning said valve plates and extending peripherally therearound; and take-up means surrounding said gasket for pressing said gasket into sealing engagement with said valve plates.

2. In a pneumatic conveyor for an ash handling system or the like, a rotary slide gate valve having a readily accessible interior and comprising, in combination: a pair of spaced parallel valve plates with axially aligned openings, said valve plates being substantially identically shaped and having aligned peripheral surfaces; a gate slidably positioned between said plates and having an opening adapted to be moved into and out of alignment with said plate openings; means for moving said gate; and readily removable means for sealing said valve including a gasket extending around and engaging the peripheral surfaces of said valve plates, a band of spring material extending around said gasket and having spaced ends, and adjustable fastening means securing the ends of said band together to tighten said band around said gasket and press said gasket into sealing engaegment with the peripheral surfaces of said valve plates.

3. In a fluid material conveying system having a line pressure above atmospheric pressure, a rotary slide gate valve comprising, in combination: a pair of spaced, facing valve plates having axially aligned openings; a gate slidably mounted between said valve plates and having an opening adapted to be moved into and out of axial alignment with said valve plate openings; means for moving said gate; sealing means surrounding said valve plates for providing a fluid tight seal and cooperating with the valve plates to provide a chamber; and means for introducing fluid at a higher pressure than said line pressure into the chamber to prevent the material passing through the valve from escaping into said chamber.

4. In a fluid material conveying system having an internal line pressure different from atmospheric pressure, a rotary slide gate valve comprising, in combination: a pair of spaced, facing valve plates having axially aligned openings; a gate slidably mounted between said valve plates and having an opening adapted to be moved into and out of axial alignment with said valve plate openings; means for moving said gate; sealing means surrounding said valve plates for providing a fluid tight seal and cooperating with the valve plates to provide a chamber; and means for introducing fluid at a higher pressure into the chamber to prevent material passing through the valve from escaping into said chamber.

5. In a fluid material conveying system having an internal line pressure below atmospheric pressure, a rotary slide gate valve comprising, in combination: a pair of spaced, facing valve plates having axially aligned openings; a gate slidably mounted between said valve plates and having an opening adapted to be moved into and out of axial alignment with said valve plate openings; means for moving said gate; sealing means surrounding said valve plates for providing a fluid tight seal and cooperating with the valve plates to provide a chamber; and means for introducing fluid at atmospheric pressure into the chamber to prevent material passing through the valve from escaping into said chamber.

6. In a fluid material conveying system having an internal line pressure different from atmospheric pressure, a rotary slide gate valve comprising, in combination: a pair of spaced, facing valve plates having axially aligned openings; a gate slidably mounted between said valve plates and having an opening adapted to be moved into and out of axial alignment with said valve plate openings; means for moving said gate; sealing means surrounding said valve plates for providing a fluid tight seal and cooperating with the valve plates to provide a chamber; and means for introducing fluid at a higher pressure than said line pressure into the chamber at the time the rotary slide gate is moved in the act of closing or opening the valve to prevent material passing through the valve from escaping into said chamber.

References Cited by the Examiner

UNITED STATES PATENTS

| | | | |
|---|---|---|---|
| 317,408 | 5/1885 | Moeser | 285—45 X |
| 3,014,493 | 12/1961 | Seger | 251—31 X |
| 3,109,457 | 11/1963 | Oliveau | 251—58 X |
| 3,203,664 | 8/1965 | Ver Nooy | 251—302 |

M. CARY NELSON, *Primary Examiner.*

H. KLINKSIEK, *Assistant Examiner.*